(12) United States Patent
Kanayama (10) Patent No.: US 9,350,173 B2
(45) Date of Patent: May 24, 2016

(54) ELECTRIC POWER CONTROL SYSTEM

(71) Applicant: DENSO CORPORATION, Kariya, Aichi-pref. (JP)

(72) Inventor: Mitsuhiro Kanayama, Takahama (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 394 days.

(21) Appl. No.: 14/071,936

(22) Filed: Nov. 5, 2013

(65) Prior Publication Data

US 2014/0145503 A1    May 29, 2014

(30) Foreign Application Priority Data

Nov. 23, 2012    (JP) .................. 2012-256963

(51) Int. Cl.
*H01H 83/18*    (2006.01)
*H02H 3/02*    (2006.01)
(Continued)

(52) U.S. Cl.
CPC . *H02J 3/381* (2013.01); *B60L 3/04* (2013.01); *B60L 11/1816* (2013.01); *B60L 11/1842* (2013.01); *B60L 11/1861* (2013.01); *H02J 3/32* (2013.01); *B60L 2210/42* (2013.01); *Y02E 60/721* (2013.01); *Y02T 10/7005* (2013.01); *Y02T 10/705* (2013.01); *Y02T 10/7044* (2013.01); *Y02T 10/7072* (2013.01); *Y02T 10/7241* (2013.01); *Y02T 90/121* (2013.01);
(Continued)

(58) Field of Classification Search
CPC ............... H02J 3/381; H02J 3/32; B60L 3/04; B60L 11/1816; B60L 11/1842; B60L 11/1861; B60L 2210/42; Y10T 307/344; Y02T 10/7044; Y02T 10/7005; Y02T 10/705; Y02T 10/7241; Y02T 10/7072; Y02T 90/163; Y02T 90/168; Y02T 90/121; Y02T 90/14; Y02T 90/128; Y02T 90/127; Y04S 10/126; Y04S 30/12; Y02E 60/721
USPC ........................................................ 307/126
See application file for complete search history.

(56) References Cited

U.S. PATENT DOCUMENTS 4,652,770 A    3/1987    Kumano
2011/0121779 A1    5/2011    Ichikawa et al.

FOREIGN PATENT DOCUMENTS

JP    61-262085    11/1986
JP    2001-186690    7/2001
(Continued)

OTHER PUBLICATIONS

Office Action dated Oct. 14, 2014 in corresponding Japanese Application No. 2012-256963.

*Primary Examiner* — Hal Kaplan
(74) *Attorney, Agent, or Firm* — Harness, Dickey & Pierce, P.L.C.

(57) ABSTRACT

An electric power control system includes an electric power supply system, a load, a power source switching unit, a charge-discharge switching unit, a converting unit, an electric power storage device, a discharge detection unit, a power supply detection unit, and a control unit. The control unit controls the discharge detection unit to detect a state of a first AC power converted by the converting unit from a DC power charged in the electric power storage device, and controls the power supply detection unit to detect a state of a second AC power supplied from the electric power supply system. The control unit regulates the first AC power based on a phase difference between the first AC power and the second AC power, and supplies the first AC power to the load.

7 Claims, 5 Drawing Sheets

(51) Int. Cl.
  *H01H 35/00* (2006.01)
  *B60L 3/04* (2006.01)
  *H02J 3/38* (2006.01)
  *H02J 3/32* (2006.01)
  *B60L 11/18* (2006.01)

(52) U.S. Cl.
  CPC .............. *Y02T 90/127* (2013.01); *Y02T 90/128* (2013.01); *Y02T 90/14* (2013.01); *Y02T 90/163* (2013.01); *Y02T 90/168* (2013.01); *Y04S 10/126* (2013.01); *Y04S 30/12* (2013.01); *Y10T 307/344* (2015.04)

(56) References Cited

FOREIGN PATENT DOCUMENTS

| | | |
|---|---|---|
| JP | 2001-204138 | 7/2001 |
| JP | 2002-315193 | 10/2002 |
| JP | 2010-035277 | 2/2010 |

ELECTRIC POWER CONTROL SYSTEM

CROSS REFERENCE TO RELATED APPLICATION

This application is based on Japanese Patent Application No. 2012-256963 filed on Nov. 23, 2012, the disclosure of which is incorporated herein by reference.

TECHNICAL FIELD

The present disclosure relates to an electric power control system which provides electric power to a load by discharging electric power charged in an electric power storage device.

BACKGROUND

JP 2002-315193 A discloses an electric power control system that supplies electric power, which is stored in an electric power storage device, to a load arranged in a house. Specifically, the electric power control system includes an alternating direct converting unit arranged between the electric power storage device and an electric power supply system. Hereinafter, AC refers to alternating current, and DC refers to direct current. When an electric power source of the load is switched from the electric power supply system to the electric power storage device, the converting unit converts DC power stored in the electric power storage device to AC power. That is, when the electric power stored in the electric power storage device is discharged, the DC power stored in the electric power storage device is converted to the AC power. Then, the AC power is supplied to the load.

However, in the above-described electric power control system, when the AC power, which is discharged from the electric power storage device and converted by the converting unit, is supplied to the load, a phase of the AC power from the electric power storage device may be substantially different from a phase of the AC power supplied from the electric power supply system. When the AC power of the electric power storage device, which has the phase substantially different from the phase of the electric power from the electric power supply system, is directly supplied to the load, the AC power applied to the load sharply changes and a malfunction or a failure may occur to the load.

SUMMARY

In view of the foregoing difficulties, it is an object of the present disclosure to provide an electric power control system that protects a load by restricting an adverse effect occurred by switching electric power source of the load between an electric power storage device and an electric power supply system.

According to an aspect of the present disclosure, an electric power control system includes an electric power supply system, a load, a power source switching unit, a charge-discharge switching unit, a converting unit, an electric power storage device, a discharge detection unit, a power supply detection unit, and a control unit. The electric power supply system supplies an alternating current (AC) power. The power source switching unit is connected with the electric power supply system and the load, and switches a power source supplied to the load. The charge-discharge switching unit is connected with the electric power supply system via a charge line and connected with the power source switching unit via a discharge line. The converting unit is connected with the charge-discharge switching unit via a charge-discharge line. The electric power storage device is connected with the converting unit. The converting unit converts the AC power supplied from the electric power supply system to a direct current (DC) power and charges the electric power storage device with the DC power when a charge condition is satisfied, and discharges the electric power storage device by converting the DC power charged in the electric power storage device to AC power when a discharge condition is satisfied. The discharge detection unit detects a state of the AC power converted by the converting unit. The AC power converted by the converting unit is referred to as a first AC power. The power supply detection unit detects a state of the AC power supplied from the electric power supply system. The AC power supplied from the electric power supply system is referred to as a second AC power. The control unit controls the discharge detection unit and the power supply detection unit. The control unit includes a convert control section, a detection control section, a calculation section, a regulation section, and a switch control section. The convert control section controls the converting unit to convert the DC power charged in the electric power storage device to the first AC power under a condition that the charge-discharge line is disconnected with the charge line. The detection control section controls, under the condition that the charge-discharge line is disconnected with the charge line, the discharge detection unit to detect the state of the first AC power and controls the power supply detection unit to detect the state of the second AC power. The calculation section calculates a phase difference between a phase of the first AC power and a phase of the second AC power. The regulation section reduces, under the condition that the charge-discharge line is disconnected with the charge line, the phase difference by regulating the phase of the first AC power when the phase difference is larger than a predetermined threshold value. The switch control section controls, under the condition that the charge-discharge line is disconnected with the charge line, the power source switching unit to connect the load with the discharge line when the discharge condition is satisfied and the phase difference is equal to or smaller than the predetermined threshold value. The switch control section further controls the power source switching unit to connect the load with the electric power supply system when the charge condition is satisfied.

With the above system, the adverse effect occurred by switching electric power source of the load between the electric power storage device and the electric power supply system is restricted and the load is protected from the adverse effect.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

The following will describe embodiments of the present disclosure with reference to the drawings.

First Embodiment

Figure 1:
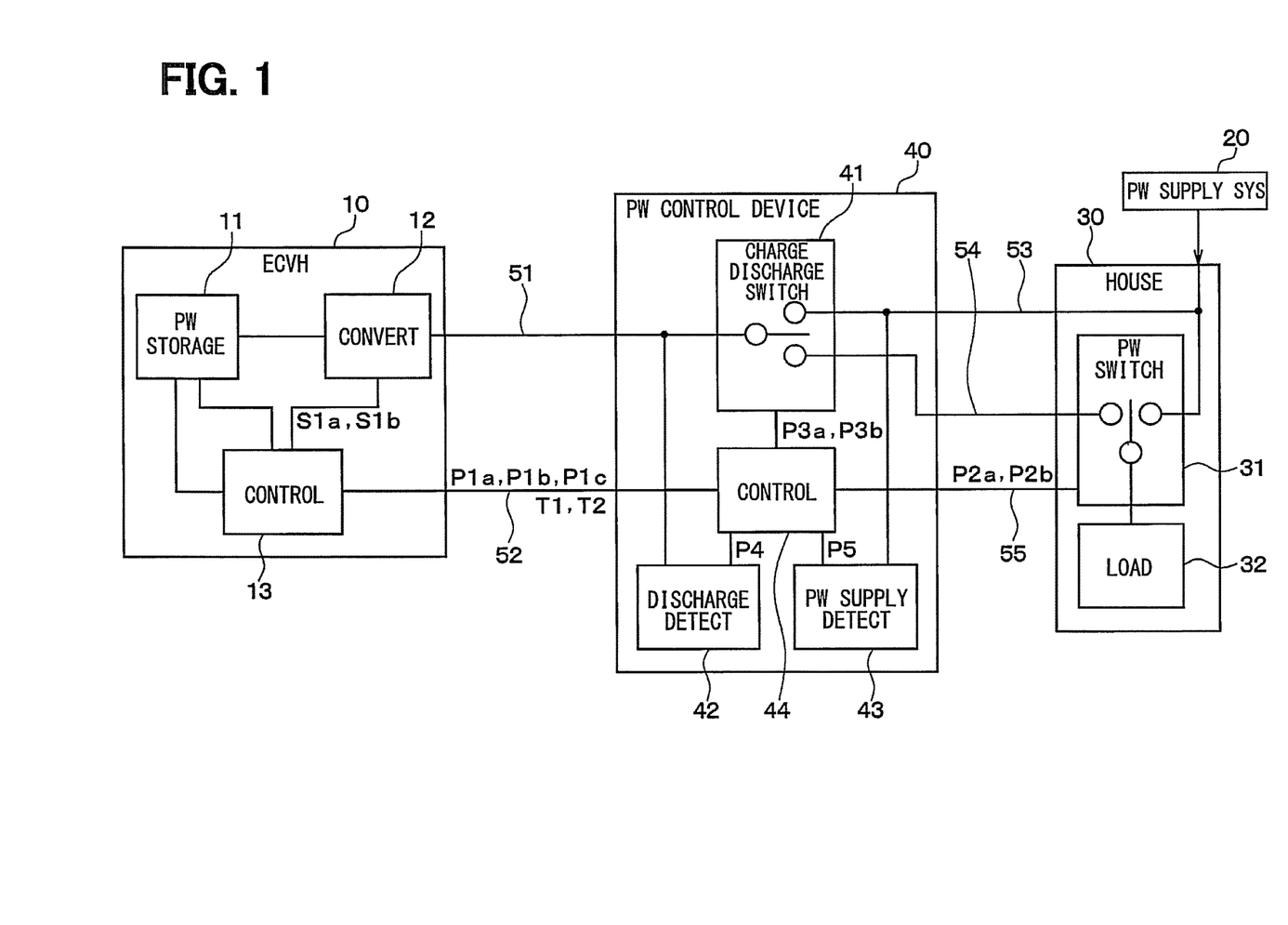
FIG. 1 is a block diagram showing a configuration of an electric power control system according to an embodiment of the present disclosure.

The following will describe an electric power control system according to a first embodiment of the present disclosure. In the following description, AC refers to alternating current, and DC refers to direct current. As shown in FIG. 1, the electric power control system according to the present embodiment includes an electric drive vehicle (EC VH) 10, a house 30 connected with an electric power supply system (PW SUPPLY SYS) 20, an electric power charge and discharge device 40 for the electric drive vehicle 10. The electric power charge and discharge device 40 is also referred to as a power control device (PW CONTROL) 40.

The electric drive vehicle 10 and the power control device 40 are connected to a first electric cable including a charge-discharge line 51 and a communication line 52. The house 30 and the power control device 40 are connected to a second electric cable including a charge line 53, a discharge line 54, and a communication line 55. The charge line 53 is connected to the electric power supply system 20.

In the present embodiment, the communication line 52 may be provided by a control pilot (CPLT) line. Further, in the present embodiment, the first electric cable and the second electric cable are included in the power control device 40. Thus, a user may connect the power control device 40 with the electric drive vehicle 10 with the first electric cable, and connect the house 30 with the power control device 40 with the second electric cable.

The electric drive vehicle 10 may be an electric vehicle, a hybrid vehicle or a fuel-cell vehicle. As shown in FIG. 1, the electric drive vehicle (EC VH) 10 includes an electric power storage device (PW STORAGE) 11, an AC-DC converting unit (CONVERT) 12, and a control unit (CONTROL) 13. Hereinafter, the control unit 13 of the electric drive vehicle 10 is also referred to as a vehicle control unit 13.

The electric power storage device 11 may be provided by a rechargeable battery such as a nickel-cadmium battery, nickel-hydrogen battery, a lithium-ion battery, a lithium battery and the like.

The AC-DC converting unit 12 includes an inverter that performs a voltage regulation, frequency regulation and a phase regulation. Hereinafter, the AC-DC converting unit 12 is referred to as a converting unit for convenience of description. The converting unit 12 is connected with the electric power storage device 11, the charge-discharge line 51, and the vehicle control unit 13. The converting unit 12 receives control signals S1$a$, S1$b$ transmitted from the vehicle control unit 13. When the converting unit 12 receives the control signal S1$a$ from the vehicle control unit 13, the converting unit 12 converts the AC power, which is supplied from the electric power supply system 20 via the charge-discharge line 51, to the DC power, and charges the electric power storage device 11 with the DC power. That is, the converting unit 12 stores the DC power converted from the AC power supplied from the electric power supply system 20 in the electric power storage device 11. When the converting unit 12 receives the control signal S1$b$ from the vehicle control unit 13, the converting unit 12 discharges the electric power storage device 11 by converting the DC power, which is charged (stored) in the electric power storage device 11, to the AC power.

In the present embodiment, the converting unit 12 converts the DC power, which is charged in the electric power storage device 11, to the AC power so that the AC power has the same voltage and frequency with the AC power supplied from the electric power supply system 20 to the house 30. For example, when the AC power supplied from the electric power supply system 20 has a voltage of 100 volt (V) and a frequency of 50 hertz (Hz), the AC power converted from the DC power of the electric power storage device 11 may have a voltage of 100 V and a frequency of 50 Hz. Further, the converting unit 12 may convert the DC power charged in the electric power storage device 11 to an AC power having the voltage and the frequency different from the voltage and the frequency of the AC power supplied from the electric power supply system 20. Hereinafter, the AC power supplied from the electric power supply system 20 is also referred to as a system AC power, and the AC power converted, by the converting unit 12, from the DC power stored in the electric power storage device 11 is also referred to as a converted AC power.

The vehicle control unit 13 includes a central processing unit (CPU), multiple memories functioning as a storage device, and one or more peripheral devices. The vehicle control unit 13 is communicable with a control unit 44 of the power control device 40 via the communication line 52. Hereinafter, the control unit of the power control device 40 is also referred to as a device control unit 44. When the vehicle control unit 13 receives a control signal P1$a$ from the device control unit 44, the vehicle control unit 13 transmits the control signal S1$a$ to the converting unit 12 in order to charge the electric power storage device 11. When the vehicle control unit 13 receives a control signal P1$b$ from the device control unit 44, the vehicle control unit 13 transmits the control signal S1$b$ to the converting unit 12 in order to discharge the electric power storage device 11. When the vehicle control unit 13 receives a control signal P1$c$ from the device control unit 44, the vehicle control unit 13 regulates the control signal S1$b$ based on the control signal P1$c$, and then transmits the control signal S1$b$ that is regulated to the converting unit 12. When the vehicle control unit 13 receives a request signal T1 from the device control unit 44, the vehicle control unit 13 determines whether a remaining power of the electric power storage device 11 is larger than a threshold power. Then, the vehicle control unit 13 transmits a determination signal T2 indicating a determination result of the remaining power of the electric power storage device 11 to the device control unit 44.

The threshold power is suitably changeable. For example, the threshold power may be set to 10% of a maximum charging capacity of the electric power storage device 11. In the present embodiment, the vehicle control unit 13 is communicably connected with the device control unit 44 via the communication line 52. Further, the vehicle control unit 13 may be connected with the device control unit 44 via a wireless communication line. The vehicle control unit 13 functions as an auxiliary control unit of the electric power control system.

As shown in FIG. 1, the house 30 includes a power source switching unit (PW SWITCH) 31 and a load 32. The load 32 may include home electric appliances that are usually used in common houses. Usually, the AC power from the electric power supply system 20 is supplied to the load 32.

The power source switching unit 31 may be provided by a switching element, such as a transistor. When the power source switching unit 31 receives a control signal P2a from the device control unit 44, the power source switching unit 31 connects the load 32 with the electric power supply system 20. When the power source switching unit 31 receives a control signal P2b from the device control unit 44, the power source switching unit 31 disconnects the load 32 with the electric power supply system 20.

Under a condition that the load 32 is connected with the electric power supply system 20, the power source switching unit 31 maintains a connection between the load 32 and the electric power supply system 20 when the control signal P2a is transmitted from the device control unit 44. Under a condition that the load 32 is connected with the discharge line 54, the power source switching unit 31 maintains a connection between the load 32 and the discharge line 54 when the control signal P2b is transmitted from the device control unit 44.

As shown in FIG. 1, the power control device (PW CONTROL DEVICE) 40 includes a charge-discharge switching unit (CHARGE DISCHARGE SWITCH) 41, a discharge detection unit (DISCHARGE DETECT) 42, a power supply detection unit (PW SUPPLY DETECT) 43 and the device control unit 44.

The charge-discharge switching unit 41 may be provided by a switching element, such, as a transistor. When the charge-discharge switching unit 41 receives a control signal P3a from the device control unit 44, the charge-discharge switching unit 41 connects the charge-discharge line 51 with the charge line 53. When the charge-discharge switching unit 41 receives a control signal P3b from the device control unit 44, the charge-discharge switching unit 41 connects the charge-discharge line 51 with the discharge line 54. That is, when the charge-discharge switching unit 41 receives a control signal P3b from the device control unit 44, the charge-discharge switching unit 41 disconnects the charge-discharge line 51 with the charge line 53.

Under a condition that the charge-discharge line 51 is connected with the charge line 53, the charge-discharge switching unit 41 maintains a connection between the charge-discharge line 51 and the charge line 53 when the control signal P3a is transmitted from the device control unit 44. Under a condition that the charge-discharge line 51 is connected with the discharge line 54, the charge-discharge switching unit 41 maintains a connection between the charge-discharge line 51 and the discharge line 54 when the control signal P3b is transmitted from the device control unit 44.

The discharge detection unit 42 is connected with the charge-discharge line 51. When the discharge detection unit 42 receives a control signal P4 from the device control unit 44, the discharge detection unit 42 detects a state of the AC power in the charge-discharge line 51. The device control unit 44 transmits the control signal P4 to the discharge detection unit 42 when the device control unit 44 discharges the electric power storage device 11. That is, the discharge detection unit 42 detects the state of the converted AC power in the charge-discharge line 51.

Parameters of the converted AC power may be detected by the discharge detection unit 42 as the state of the converted AC power, and the parameters are suitably changeable. In the present embodiment, the discharge detection unit 42 detects at least zero cross points or frequency f1 of an AC voltage of the converted AC power.

The power supply detection unit 43 is connected with the charge line 53. When the power supply detection unit 43 receives a control signal P5 from the device control unit 44, the power supply detection unit 43 detects a state of the system AC power in the charge line 53. That is, the power supply detection unit 43 detects the state of the AC power supplied from the electric power supply system 20. The device control unit 44 transmits the control signal P5 to the power supply detection unit 43 concurrently with the control signal P4.

Parameters of the system AC power may be detected by the power supply detection unit 43 as the state of the AC power, and the parameters are suitably changeable. In the present, embodiment, the power supply detection unit 43 detects at least zero cross points or frequency f2 of an AC voltage of the system AC power.

The device control unit 44 includes a CPU, multiple memories functioning as a storage device, and one or more peripheral devices. The device control unit 44 transmits the control signals P1a, P1b, P1c to control the vehicle control unit 13, transmits the control signals P2a, P2b to control the power source switching unit 31, transmits the control signals P3a, P3b to control the charge-discharge switching unit 41, transmits the control signal P4 to control the discharge detection unit 42, and transmits the control signal P5 to control the power supply detection unit 43. The device control unit 44 functions as a control unit of the electric power control system.

When a charge time period comes or an operation is performed by the user, the electric power control system starts the charge of the electric power storage device 11, and the device control unit 44 transmits the control signals P1a, P2a, P3a. Specifically, when the electric power control system starts the charge of the electric power storage device 11, the device control unit 44 transmits the control signal P3a to the charge-discharge switching unit 41 so that the charge-discharge switching unit 41 connects the charge-discharge line 51 with the charge line 53. Further, the device control unit 44 transmits the control signal P1a to the vehicle control unit 13. When the vehicle control unit 13 receives the control signal P1a, the vehicle control unit 13 transmits the control signal S1a to the converting unit 12 so that the converting unit 12 converts the system AC power supplied via the charge line 53 and the charge-discharge line 51 to the DC power and charges the electric power storage device 11 with the DC power. Further, the device control unit 44 transmits the control signal P2a to the power source switching unit 31 so that the power source switching unit 31 connects the load 32 with the electric power supply system 20.

When a discharge time period comes or an operation is performed by the user, the electric power control system supplies the electric power stored in the electric power storage device 11 to the load 32. That is, when the discharge time period comes or the operation is performed by the user, the electric power control system discharges electric power storage device 11. In this case, the device control unit 44 transmits the control signals P1b, P3b, P4, P5. Specifically, when the device control unit 44 transmits the control signal P3b to the charge-discharge switching unit 41 so that the charge-discharge switching unit 41 connects the charge-discharge line 51 with the discharge line 54. Further, the device control unit 44 transmits the control signal P1b to the vehicle control unit 13. In response to the control signal P1b, the vehicle control unit 13 transmits the control signal S1b to the converting unit 12 so that the converting unit 12 converts the DC power charged in the electric power storage device 11 to the AC power.

Figure 2A:
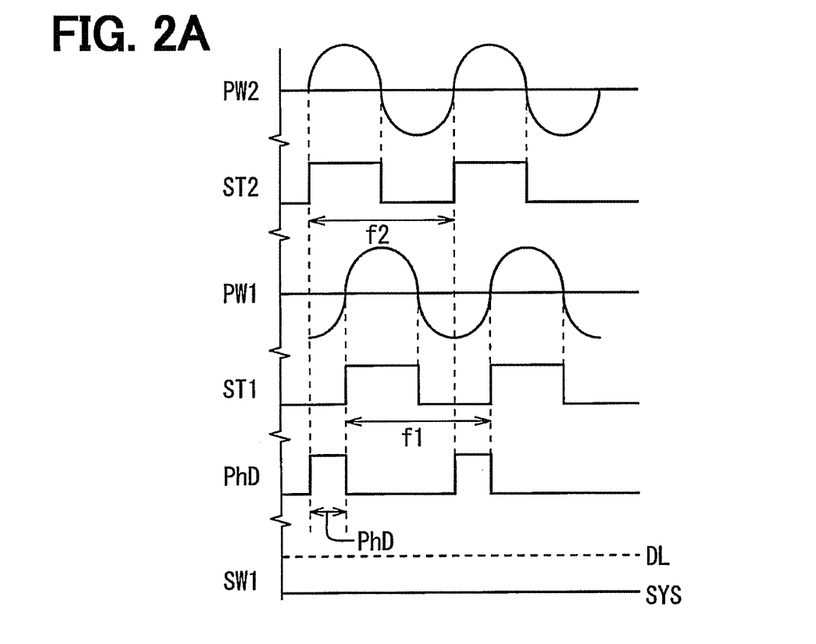
FIG. 2A is a diagram showing a converted AC power before a regulation.

The device control unit 44 further transmits the control signal P4 to the discharge detection unit 42 so that the discharge detection unit 42 detects the state of the converted AC power in the charge-discharge line 51. The device control unit 44 further transmits the control signal P5 to the power supply detection unit 43 so that the power supply detection unit 43 detects the state of the system AC power in the charge line 53. Then, as shown in FIG. 2A, the device control unit 44 receives a state detection result ST1 of the converted AC power PW1 from the discharge detection unit 42, and receives a state detection result ST2 of the system AC power PW2 transmitted from the power supply detection unit 43. Then, the device control unit 44 calculates a phase difference PhD between a phase of the converted AC power and a phase of the system AC power based on the state detection results.

When the phase difference is larger than a predetermined threshold value, the device control unit 44 transmits the control signal P1c, which notifies the phase difference larger than the threshold value, to the vehicle control unit 13. For example, the control signal P1c may have a frequency higher than a frequency of the control signal P1b, and the control signal P1c may be superimposed on the control signal P1b via a coupling element and the two control signals P1b, P1c are transmitted to the vehicle control unit 13 together by a communication device. Herein, the coupling element may be provided by a coupling capacitor. With this configuration, the control signal P1b is not affected by the control signal P1c. When the phase difference is larger than the threshold value, the power source switching unit 31 outputs a switch signal SW1 to maintain the disconnection state between the load 32 and the discharge line (DL) 54 as shown in FIG. 2A. That is, the load 32 is maintained in a connection state with the electric power supply system (SYS) 20.

Figure 2B:
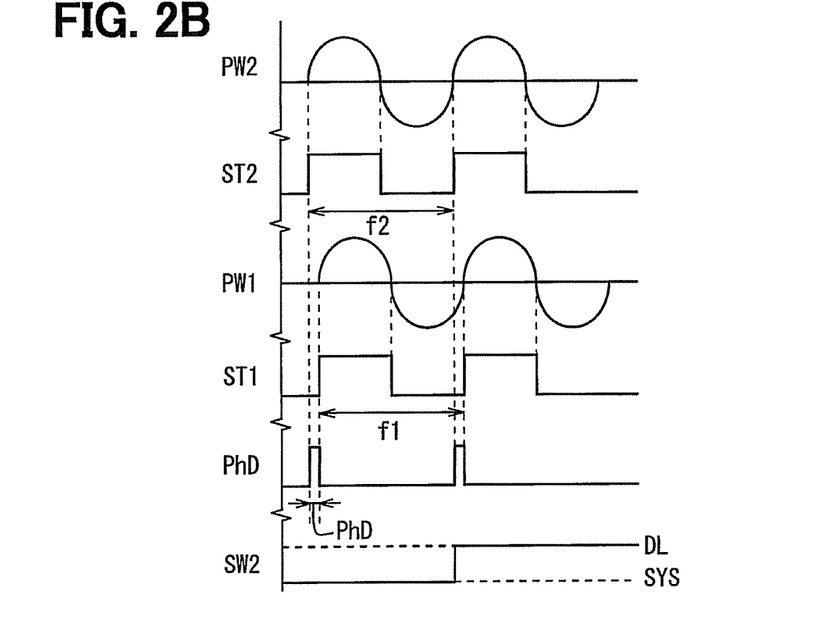
FIG. 2B is a diagram showing a converted AC power after the regulation according to a first embodiment of the present disclosure.

When the vehicle control unit 13 receives the control signal P1c from the device control unit 44, the vehicle control unit 13 regulates the control signal S1b based on the control signal P1c, and then transmits the control signal S1b to the converting unit 12. Thus, as shown in FIG. 2B, the regulated phase difference between the converted AC power and the system AC power is equal to or smaller than the threshold value. Further, the vehicle control unit 13 may regulate the phase difference so that the phase difference is equal to zero.

When the phase difference is equal to or smaller than the threshold value, the device control unit 44 transmits the control signal P2b to the power source switching unit 31. In response to the control signal P2b, the power source switching unit 31 outputs a switch signal SW2 to connect the load 32 with the discharge line (DL) 54 as shown in FIG. 2B. That is, the load 32 is disconnected with the electric power supply system (SYS) 20. By connecting the load 32 with the discharge line 54, the converted AC power is supplied to the load 32.

The threshold value of the phase difference may be set equal to or smaller than a maximum value of a normal-operation phase difference under which the load 32 performs a normal operation. The normal-operation phase difference may be decided by monitoring the operation of the load 32 under various phase differences. For example, the threshold value may be set as one hundredth of a frequency of the system AC power. Since the normal-operation phase difference is decided based on a monitoring result (operation history) of the operation of the load 32, the threshold value of the phase difference is able to be set as an optimum value with respect to the load 32.

Further, the charge time period and the discharge time period may be set by the user. The user may set the charge time period and the discharge time period based on an electric power rate. For example, the user may set the charge time period to a time period during which the electric power rate is low, such as a midnight period. Further, the user may set the discharge time period to a time period during which the electric power rate is high, such as a daytime period.

The user may operate a liquid crystal panel equipped to the power control device 40 or the house 30 in order to start the charge or the discharge of the electric power storage device 11. In the present embodiment, the operation performed by the user has a higher priority than the charge time period and the discharge time period set by the user. For example, when the user performs an operation to discharge the electric power storage device 11 at a night time, the electric power control system executes the discharge of the electric power storage device 11. Further, the charge and the discharge of the electric power storage device 11 may be controlled only by the operation of the user without setting the charge time period and the discharge time period.

The following will describe a process executed by the electric power control system. In the process executed by the electric power control system, the discharge of the electric power storage device 11 will be mainly described. Further, the process is executed under a condition that the electric drive vehicle 10 is connected with the power control device 40 via the charge-discharge line 51 and the communication line 52, and the house 30 is connected with the power control device 40 via the charge line 53, the discharge line 54, and the communication line 55.

Figure 3:
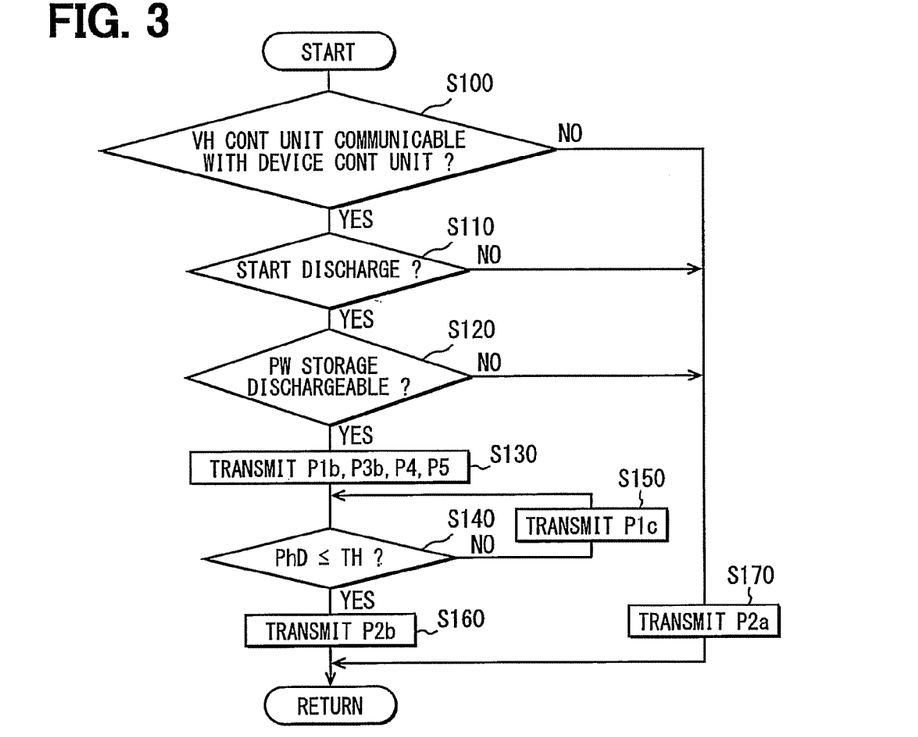
FIG. 3 is a flowchart showing a process executed by a device control unit according to the first embodiment.

First, a process executed by the device control unit 44 will be described with reference to a flowchart shown in FIG. 3. In the present embodiment, the process shown in FIG. 3 is executed by the device control unit 44 at a predetermined time interval, such as every 5 minutes or every 30 minutes. When the user performs the operation to charge or discharge the electric power storage device 11, the process shown in FIG. 3 is promptly executed by the device control unit 44 in response to the operation performed by the user.

As shown in FIG. 3, when the process starts, the device control unit 44 determines whether the vehicle control unit 13 is communicably connected with the device control unit 44 at S100. For example, the device control unit 44 determines whether the charge-discharge line 51 and the communication line 52 are properly connected with the electric drive vehicle 10. Further, the device control unit 44 determines whether the charge line 53, the discharge line 54, and the communication line 55 are properly connected with the house 30.

When the device control unit 44 determines that the vehicle control unit 13 is communicably connected with the device control unit 44 (S100: YES), the device control unit 44 further determines whether to perform the discharge of the electric power storage device 11 at S110. For example, the device control unit 44 determines whether the discharge time period, comes or an operation is performed by the user. When the device control unit 44 determines that the operation is performed by the user, the device control unit 44 further determines whether the operation is an operation for discharging the electric power storage device 11. Hereinafter, the operation for discharging the electric power storage device 11 is also referred to as a discharge operation. At 5110, when the discharge operation of the user is performed during a time period other than the discharge time period, the discharge operation performed by the user is prioritized and the electric power control system starts the discharge of the electric power storage device 11.

When the device control unit 44 determines to perform the discharge of the electric power storage device 11 (S110: YES), the device control unit 44 further determines whether the electric power storage device 11 is actually dischargeable at S120. Specifically, the device control unit 44 transmits the request signal T1 to the vehicle control unit 13 and receives the determination signal T2 from the vehicle control unit 13 in order to determine whether the electric power storage device 11 is actually dischargeable. Specifically, when the vehicle control unit 13 receives the request signal T1 from the device control unit 44, the vehicle control unit 13 determines whether the remaining power of the electric power storage device 11 is larger than the threshold power. Then, the vehicle control unit 13 transmits the determination signal T2 indicating whether the remaining power of the electric power storage device 11 is larger than the threshold power to the device control unit 44. When the remaining power of the electric power storage device 11 is larger than the threshold power, the electric power storage device 11 is dischargeable.

When the device control unit 44 determines that the electric power storage device 11 is actually dischargeable (S120: YES), the device control unit 44 transmits the control signal P1b to the vehicle control unit 13 and transmits the control signal P3b to the charge-discharge switching unit 41. Further, the device control unit 44 transmits the control signal P4 to the discharge detection unit 42 and transmits the control signal P5 to the power supply detection unit 43. When the device control unit 44 determines that the vehicle control unit 13 is communicably connected with the device control unit 44 (S100: YES), determines to perform the discharge of the electric power storage device 11 (S110: YES), and determines that the electric power storage device 11 is actually dischargeable (S120: YES), a discharge condition for discharging the electric power storage device 11 is satisfied.

When the charge-discharge switching unit 41 receives the control signal P3b from the device control unit 44, the charge-discharge switching unit 41 connects the charge-discharge line 51 with the discharge line 54. When the vehicle control unit 13 receives the control signal P1b from the device control unit 44, the vehicle control unit 13 controls the converting unit 12 so that the converting unit 12 converts the DC power charged in the electric power storage device 11 to the AC power. When the discharge detection unit 42 receives the control signal P4 from the device control unit 44, the discharge detection unit 42 detects the state of the converted AC power in the charge-discharge line 51. When the power supply detection unit 43 receives the control signal P5 from the device control unit 44, the power supply detection unit 43 detects the state of the system AC power in the charge line 53.

Then, the device control unit 44 calculates the phase difference between the converted AC power and the system AC power based on the detection results transmitted from the discharge detection unit 42 and the power supply detection unit 43 at S140. Then, the device control unit 44 determines whether the phase difference is equal to or smaller than the threshold value (TH) at S140. When the device control unit 44 determines that the phase difference is equal to or smaller than the threshold value (S140: YES), the device control unit 44 transmits the control signal P2b to the power source switching unit 31. When the power source switching unit 31 receives the control signal P2b, the power source switching unit 31 connects the load 32 with the discharge line 54 so that the converted AC power is supplied to the load 32.

Further, the power source switching unit 31 may switch the power source of the load 32 from the system AC power to the converted AC power at a zero cross point of the converted AC power or at a zero cross point of the system AC power. By converting the power source at the zero cross point of the converted AC power or the system AC power, the load 32 is less likely to be affected by the switch of the power source. Herein, the zero cross point includes a point at which the converted AC power or the system AC power completely decreases to zero and a point at which the converted AC power or the system AC power decreases close to zero.

When the device control unit 44 determines that the phase difference is larger than the threshold value (S140: NO), the device control unit 44 transmits the control signal P1c to the vehicle control unit 13. When the vehicle control unit 13 receives the control signal P1c, the vehicle control unit 13 regulates the phase of the converted AC power so that the phase difference between the converted AC power and the system AC power is reduced.

When the device control unit 44 determines that the vehicle control unit 13 is not communicably connected with the device control unit 44 (S100: NO), the device control unit 44 transmits the control signal P2a to the power source switching unit 31 at S170. Further, when the device control unit 44 determines to not perform the discharge of the electric power storage device 11 (S110: NO), the device control unit 44 transmits the control signal P2a to the power source switching unit 31 at S170. Further, when the device control unit 44 determines that the electric power storage device 11 is not dischargeable (S120: NO), the device control unit 44 transmits the control signal P2a to the power source switching unit 31 at S170. When the power source switching unit 31 receives the control signal P2a, the power source switching unit 31 connects the load 32 with the electric power supply system 20.

When the device control unit 44 determines to not perform the discharge of the electric power storage device 11 (S110: NO), the device control unit 44 basically performs the charge of the electric power storage device 11. Further, when the device control unit 44 determines that the electric power storage device 11 is not dischargeable (S120: NO), the device control unit 44 basically performs the charge of the electric power storage device 11. Thus, the device control unit 44 transmits the control signals P1a, P2a, P3a. Specifically, the device control unit 44 transmits the control signal P3a to the charge-discharge switching unit 41 so that the charge-discharge switching unit 41 connects the charge-discharge line 51 with the charge line 53. Further, the device control unit 44 transmits the control signal P1a to the vehicle control unit 13 so that the vehicle control unit 13 controls the converting unit 12 to convert the system AC power to the DC power and charge the electric power storage device 11 with the DC power. Further, the device control unit 44 transmits the control signal P2a to the power source switching unit 31 so that the power source switching unit 31 connects the load 32 with the electric power supply system 20. When the device control unit 44 determines to not perform the discharge of the electric power storage device 11 (S110: NO) or determines that the electric power storage device 11 is not dischargeable (S120: NO), a charge condition of the electric power storage device 11 is satisfied.

As described above, when the device control unit 44 transmits the control signals P1a to P5 to each unit 13, 31, 41, 42, 43 under a condition that each unit 13, 31, 41, 42, 43 is already in a state corresponding to the control signal P1a to P5, each unit 13, 31, 41, 42, 43 maintains the state corresponding to the control signal. For example, when the device control unit 44 transmits the control signal P2a to the power source switching unit 31 at S170 under a condition that the load 32 is already connected with the electric power supply system 20, the power source switching unit 31 maintains the connection state between the load 32 and the electric power supply system 20.

Figure 4:
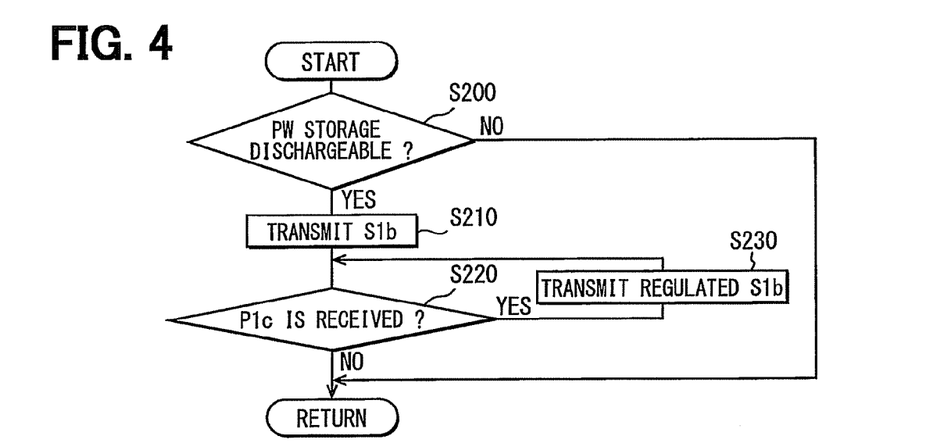
FIG. 4 is a flowchart showing a process executed by a vehicle control unit.

The following will describe a process executed by the vehicle control unit 13 with reference to a flowchart shown in FIG. 4. When the vehicle control unit 13 receives the request signal T1 from the device control unit 44 at S120, the vehicle control unit 13 executes the process.

When the vehicle control unit 13 receives the request signal T1 from the device control unit 44 at S120, the vehicle control unit 13 determines whether the electric power storage device 11 is dischargeable at S200. Specifically, the vehicle control unit 13 detects the remaining power of the electric power storage device 11, and determines whether the remaining power of the electric power storage device 11 is larger than the threshold power. Then, the vehicle control unit 13 transmits the determination signal T1 indicating the determination result of the remaining power of the electric power storage device 11 to the device control unit 44.

When the vehicle control unit 13 determines that the electric power storage device 11 is dischargeable (S200: YES), the vehicle control unit 13 receives the control signal P1b from the device control unit 44 and transmits the control signal S1b to the converting unit 12 in response to the control signal P1b at S210. When the converting unit 12 receives the control signal S1b from the vehicle control unit 13, the converting unit 12 converts the DC power, which is charged in the electric power storage device 11, to the AC power.

At S220, the vehicle control unit 13 determines whether the control signal P1c, which is transmitted from the device control unit 44 at S150, is received at S220. When the vehicle control unit 13 receives the control signal P1c (S220: YES), the vehicle control unit 13 regulates the control signal S1b based on the control signal P1c, and transmits the control signal S1b that is regulated to the converting unit 12.

The regulated control signal S1b is a signal that delays the phase of the AC converted power. By delaying the phase of the converted AC power, the phase difference between the converted AC power and the system AC power is reduced.

When the vehicle control unit 13 does not receive the control signal P1c (S220: NO), the vehicle control unit 13 ends the process.

When the vehicle control unit 13 determines that the electric power storage device 11 is not dischargeable (S200: NO), the vehicle control unit 13 receives the control signal P1a from the device control unit 44 and transmits the control signal S1a to the converting unit 12. Then, the converting unit 12 converts the system AC power to the DC power, and charges the electric power storage device 11 with the DC power.

In the present embodiment, the process executed by the device control unit 44 at S130 functions as a detection control section and a convert control section. The process executed by the device control unit 44 at S140 functions as a calculation section. The process executed by the device control unit 44 at S150 functions as a regulation section. The processes executed by the device control unit 44 at S160, S170 function as switch control section. The converted AC power corresponds to a first AC power, and the system AC power corresponds to a second AC power. The control signal P1b corresponds to a first control signal and the control signal P1c corresponds to a second control signal.

As described above, in the present embodiment, the state of the converted AC power and the state of the system AC power are detected by the device control unit 44. When the phase difference is equal to or smaller than the threshold value, the converted AC power is supplied to the load 32. Thus, the load 32 is less likely to be affected by the switch of the power source from the electric power supply system 20 to the electric power storage device 11. That is, when the power source of the load 32 is switched between the electric power storage device 11 and the electric power supply system 20, an adverse effect caused by the switching of the power source is restricted, and accordingly, the load 32 is protected from the adverse effect.

The above description mainly describes the connection of the load 32 with the discharge line 54 when the load 32 is connected with the electric power supply system 20. Similarly, the load 32 may be connected with the electric power supply system 20 from a state in which the load 32 is connected with the discharge line 54. For example, when the discharge time period switches to the charge time period, the phase difference between the converted AC power and the system AC power may be regulated to equal to or smaller than the threshold value. Then, the power source switching unit 31 may switch the connection between the load 32 and the discharge line 54 to the connection between the load 32 and the electric power supply system 20.

In the present embodiment, as described above, the control unit 44 includes the convert control section S130, the detection control section S130, the calculation section S140, the regulation section S150, and a switch control section S160. The convert control section S130 controls the converting unit 12 to convert the DC power charged in the electric power storage device 11 to the first AC power under a condition that the charge-discharge line 51 is disconnected with the charge line 53. The detection control section S130 controls, under the condition that the charge-discharge line 51 is disconnected with the charge line 53, the discharge detection unit 42 to detect the state of the first AC power and controls the power supply detection unit 43 to detect the state of the second AC power. The calculation section S140 calculates a phase difference between a phase of the first AC power and a phase of the second AC power. The regulation section S150 reduces, under the condition that the charge-discharge line 51 is disconnected with the charge line 53, the phase difference by regulating the phase of the first AC power when the phase difference is larger than a predetermined threshold value. The switch control section S160 controls, under the condition that the charge-discharge line 51 is disconnected with the charge line 53, the power source switching unit 31 to connect the load 32 with the discharge line 54 when the discharge condition is satisfied and the phase difference is equal to or smaller than the predetermined threshold value. The switch control section S170 further controls the power source switching unit 31 to connect the load 32 with the electric power supply system 20 when the charge condition is satisfied.

Further, in the present embodiment, the vehicle control unit 13 may function as the auxiliary, control unit. The auxiliary control unit 13 is communicably connected with the control unit 44 and controls the converting unit 12 based on the first control signal P1b transmitted from the convert control section S130 of the control unit 44. The regulation section S150 generates the second control signal P1c, which indicates the phase difference and has a frequency higher than a frequency of the first control signal P1b. The control unit 44 superimposes the second control signal P1c on the first control signal P1b via the coupling element and transmits the first control signal P1b and the second control signal P1c together to the auxiliary control unit 13.

Further, in the present embodiment, the switch control section S160 may control the power source switching unit 31 to connect the load 32 with the discharge line 54 at the zero cross point of the first AC power or at the zero cross point of the second AC power. The switch control section S170 may control the power source switching unit 31 to connect the load 32 with the electric power supply system 20 at the zero cross point of the first AC power or at the zero cross point of the second AC power.

Further, the detection control section S130 may control the discharge detection unit 42 to detect at least the AC voltage of the first AC power as the state of the first AC power, and control the power supply detection unit 43 to detect at least the AC voltage of the second AC power as the state of the second AC power.

Further, as described above, the predetermined threshold value of the phase difference is set equal to or smaller than the maximum value of the normal-operation phase difference, under which the load 32 performs the normal operation.

Second Embodiment

Figure 5A:
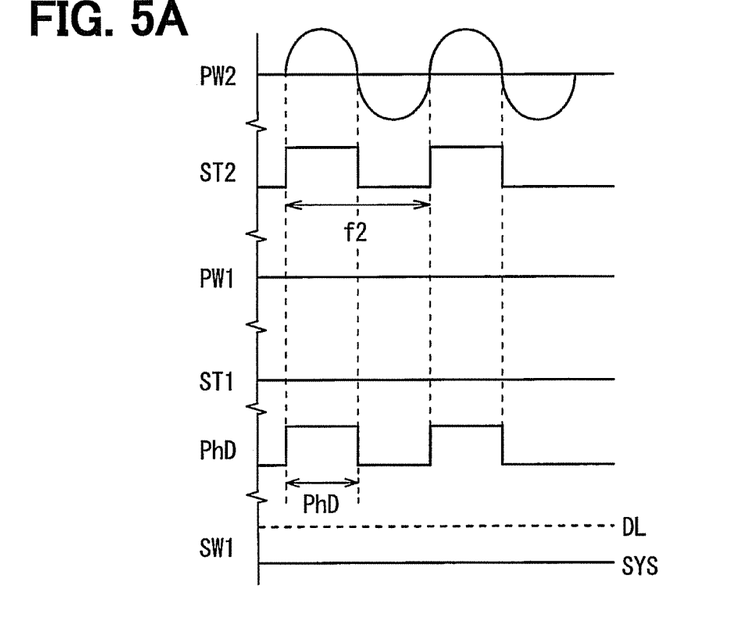
FIG. 5A is a diagram showing a converted AC power before a regulation.
Figure 5B:
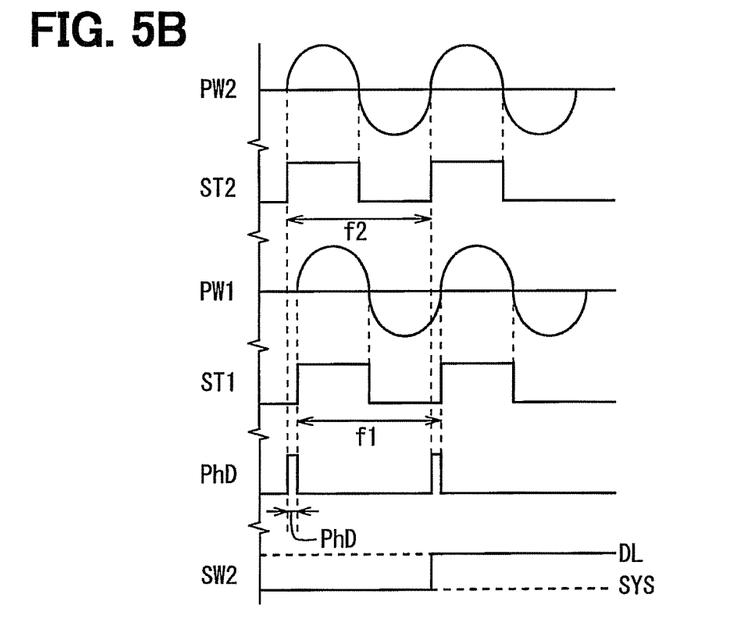
FIG. 5B is a diagram showing a converted AC power after the regulation according to a second embodiment of the present disclosure.
Figure 6:
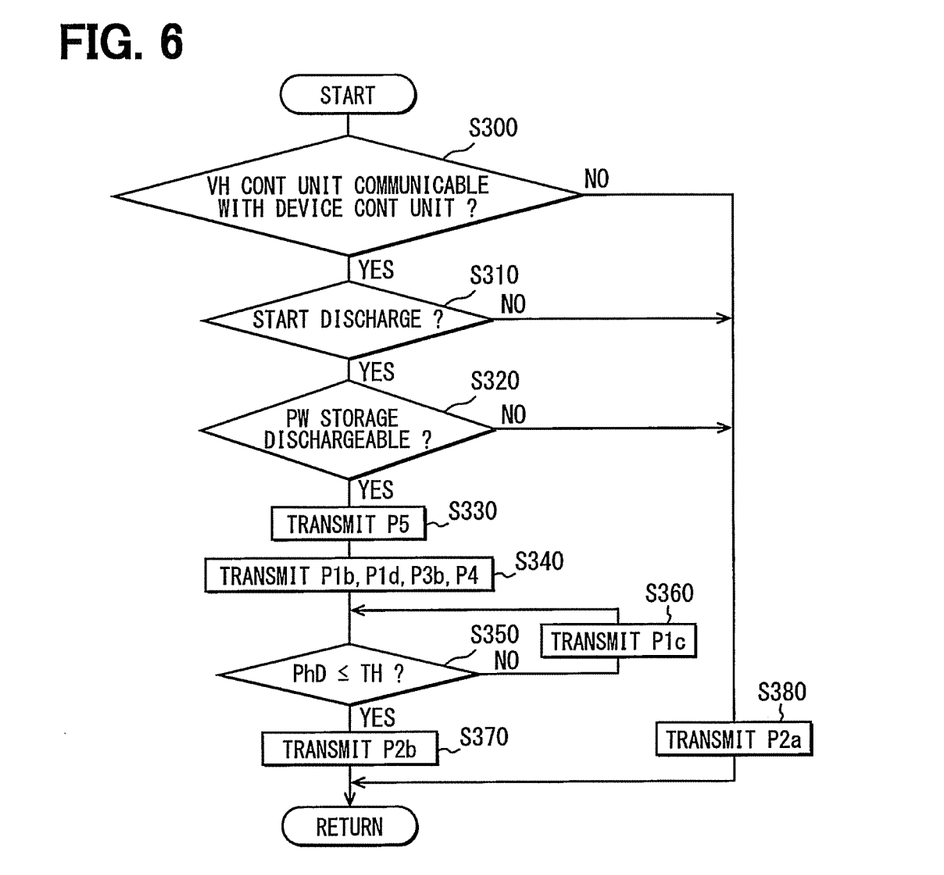
FIG. 6 is a flowchart showing a process executed by a device control unit according to the second embodiment.

The following will describe an electric power control system according to a second embodiment of the present disclosure with reference to FIG. 5A to FIG. 6. In the present embodiment, the state of the system AC power supplied from the electric power supply system 20 is detected before transmitting the control signals P1b, P3b, P4 and a control signal P1d. Other parts and configuration are similar to the electric power control system according to the first embodiment. Further, a configuration of the electric power control system according to the present embodiment is similar to the configuration of the electric power control system according to the first embodiment as shown in FIG. 1. In the electric power control system according to the first embodiment, the device control unit 44 transmits the controls signals P1a, P1b, P1c to the vehicle control unit 13. In the present embodiment, the device control unit 44 transmits the controls signals P1a, P1b, P1c, P1d to the vehicle control unit 13.

In the present embodiment, before the discharge of the electric power storage device 11, the device control unit 44 transmits only the control signal P5 to the power supply detection unit 43 at first. That is, as shown in FIG. 5A, the power supply detection unit 43 detects the state of the system AC power, and the device control unit 44 receives a state detection result ST2 of the system AC power PW2 from the power supply detection unit 43. Then, the device control unit 44 generates a control signal P1d based on the state detection result ST2, and transmits the control signal P1d concurrently with the control signal P1b to the vehicle control unit 13.

The control signal P1d may be a pulse signal that is synchronized with the system AC power.

When the vehicle control unit 13 receives the control signal P1d, the vehicle control unit 13 regulates the control signal S1b based on the control signal P1d, and transmits the control signal S1b that is regulated to the converting unit 12. Thus, the converting unit 12 is able to convert the DC power charged in the electric power storage device 11 to the AC power that is similar to the system AC power as shown in FIG. 5B.

The following will describe a process executed by the device control unit 44 with reference to a flowchart shown in FIG. 6.

When the process starts, the device control unit 44 determines whether the vehicle control unit 13 is communicably connected with the device control unit 44 at S300. When the device control unit 44 determines that the vehicle control unit 13 is communicably connected with the device control unit 44 (S300: YES), the device control unit 44 determines whether to perform the discharge of the electric power storage device 11 at S310. When the device control unit 44 determines to perform the discharge of the electric power storage device 11 (S310: YES), the device control unit 44 determines whether the electric power storage device 11 is actually dischargeable at S320.

When the device control unit 44 determines that the electric power storage device 11 is actually dischargeable (S320: YES), the device control unit 44 transmits the control signal P5 to the power supply detection unit 43 at S330. When the power supply detection unit 43 receives the control signal P5 from the device control unit 44, the power supply detection unit 43 detects the state of the system AC power PW2 and outputs the state detection result ST2 of the system AC power to the device control unit 44 as shown in FIG. 5A. At this time, since the control signal P1b is not transmitted to the vehicle control unit 13, the converting unit 12 has not started converting of the DC power charged in the electric power storage device 11 to the AC power. Thus, as shown in FIG. 5A, the converted AC power PW1 and the state detection result ST1 of the converted AC power are both zero.

Then, the device control unit 44 receives the state detection result ST2 of the system AC power PW2. At S340, the device control unit 44 transmits the control signals P1b, P1d to the vehicle control unit 13, transmits the control signal P3b to the charge-discharge switching unit 41, and transmits the control signal P4 to the discharge detection unit 42. When the vehicle control unit 13 receives the control signal P1b, the vehicle control unit 13 transmits the control signal S1b, which is regulated based on the control signal P1d, to the converting unit 12. When the charge-discharge switching unit 41 receives the control signal P3b, the charge-discharge switching unit 41 connects the charge-discharge line 51 with the discharge line 54. Then, the converting unit 12 converts the DC power charged in the electric power storage device 11 to the AC power based on the control signal S1b. When the discharge detection unit 42 receives the control signal P4, the discharge detection unit 42 detects the state of the converted AC power, and outputs the state detection signal ST1 of the converted AC power PW1 as shown in FIG. 5B. In FIG. 5B, PW2 shows the system AC power at the time when the control signal P4 is received by the discharge detection unit 42, and ST2 shows the state detection result of the system AC power at the time when the control signal P4 is received by the discharge detection unit 42.

Then, the device control unit 44 calculates the phase difference PhD between the converted AC power and the system AC power 20 based on the detection results from the discharge detection unit 42 and the power supply detection unit 43 at S350. Then, the device control unit 44 determines whether the phase difference is equal to or smaller than the threshold value at S350. When the device control unit 44 determines that the phase difference is larger than the threshold value (S350: NO), the device control unit 44 transmits the control signal P1c, which indicates the phase difference is larger than the threshold value, to the vehicle control unit 13 at S360.

When the device control unit 44 determines that the phase difference is equal to or smaller than the threshold value (S350: YES), the device control unit 44 transmits the control signal P2b to the power source switching unit 31 at S370. When the power source switching unit 31 receives the control signal P2b, the power source switching unit 31 connects the load 32 with the discharge line 54 so that the converted AC power is supplied to the load 32. Specifically, as shown in FIG. 5B, the power source switching unit 31 outputs a switch signal SW2 to connect the load 32 with the discharge line (DL) 54. That is, the load 32 is disconnected with the electric power supply system (SYS) 20.

When the phase difference is larger than the threshold value (S350: NO), the power source switching unit 31 outputs a switch signal SW1 to maintain the disconnection state between the load 32 and the discharge line (DL) 54 as shown in FIG. 5A. That is, the load 32 is maintained in a connection state with the electric power supply system (SYS) 20.

When the device control unit 44 determines that the vehicle control unit 13 is not communicably connected with the device control unit 44 (S300: NO), the device control unit 44 transmits the control signal P2a to the power source switching unit 31 at S380. Further, when the device control unit 44 determines to not perform the discharge of the electric power storage device 11 (S310: NO), the device control unit 44 transmits the control signal P2a to the power source switching unit 31 at S380. Further, when the device control unit 44 determines that the electric power storage device 11 is not dischargeable (5320: NO), the device control unit 44 transmits the control signal P2a to the power source switching unit 31 at S380. When the power source switching unit 31 receives the control signal P2a, the power source switching unit 31 connects the load 32 with the electric power supply system 20.

In the process executed by the vehicle control unit 13 according to the present embodiment, the vehicle control unit 13 transmits the control signal S1b to the converting unit 12 in response to the control signal P1b received at S210. In the present embodiment, the vehicle control unit 13 transmits the control signal S1b, which is regulated based on the control signal P1d, to the converting unit 12. With this configuration, the converting unit 12 is capable of converting the DC power charged in the electric power storage device 11 to the AC power, whose state is close to the state of the system AC power.

In the present embodiment, the process executed by the device control unit 44 at S330 functions as an additional detection control section. The process executed by the device control unit 44 at S340 functions as a convert control section and a detection control section. The process executed by the device control unit 44 at S350 functions as a calculation section. The process executed by the device control unit 44 at S360 functions as a regulation section. The processes executed by the device control unit 44 at S370, S380 function as switch control section. The converted AC power corresponds to a first AC power, and the system AC power corresponds to a second AC power. The control signal P1b corresponds to a first control signal, the control signal P1c corresponds to a second control signal, and the control signal P1d corresponds to a third control signal.

As described above, when the electric power control system according to the present embodiment performs the discharge of the electric power storage device 11, the electric power control system may control the power supply detection unit 43 to detect the state of the system AC power.

In the present embodiment, the control signal P1c is transmitted to the vehicle control unit 13 by being superimposed on the control signal P1b. Further, similar to the control signal P1d, the control signal P1c may be transmitted to the vehicle control unit 13 via a pulse signal In the present embodiment, the control signal P1d is transmitted to the vehicle control unit 13 via the pulse signal. Further, the control signal P1d may be transmitted to the vehicle control unit 13 by being superimposed on the control signal P1b.

In the present embodiment, the control unit 44 further includes the additional detection control section S330 that controls the power supply detection unit 43 to detect the state of the second AC power before the converting unit 12 converts the DC power charged in the electric power storage device 11 to the first AC power. The additional detection control section S330 outputs the detection result, which indicates the state of the second AC power before the converting unit 12 converts the DC power charged in the electric power storage device 11 to the first AC power, to the convert control section 5340. The convert control section S340 controls the converting unit 12 to convert the DC power charged in the electric power storage device 11 to the first AC power based on the detection result transmitted from the additional detection control section S330 so that the phase difference between the phase of the first AC power and the phase of the second AC power is reduced.

Further, in the present embodiment, the additional detection control section S330 outputs the detection result of the state of the second AC power to the convert control section S340. The convert control section S340 generates the third control signal P1d based on the detection result transmitted from the additional detection control section S330, and may transmit the first control signal P1b and the third control signal P1d to the auxiliary control unit 13 via the pulse signal.

Other Embodiments

In the foregoing embodiments, the power control device 40 is arranged between the electric drive vehicle 10 and the house 30. Further, the power control device 40 may be integrated with the house 30. That is, the power control device 40 may be included in the house 30.

The electric power storage device 11 and the converting unit 12 may be equipped to the house 30 other than the electric drive vehicle 10. That is, the power control device 40 may be integrated with the house 30 and the electric power storage device 11 and the converting unit 12 may be arranged in the house 30. In this case, the house 30 may include a control unit corresponding to the vehicle control unit 13.

In the foregoing embodiments, the device control unit 44 controls the converting unit 12 via the vehicle control unit 13. Further, the device control unit 44 may directly control the converting unit 12. Specifically, when the electric power control system includes the electric power storage device 11 and the converting unit 12, which are arranged in the house 30, the electric power storage device 11 and the converting unit 12 may be controlled by the device control unit 44 only.

In the foregoing embodiments, the first electric cable including the charge-discharge line 51 and the communication line 52 is included in the power control device 40. The second electric cable including the charge line 53, the discharge line 54, and the communication line 55 is also included in the power control device 40. Further, the first electric cable may be included in the electric drive vehicle 10, and the second electric cable may be included in the house 30.

In the foregoing embodiments, the discharge detection unit 42 is connected with the charge-discharge line 51. Further, the discharge detection unit 42 may be connected with the discharge line 54 when the discharge line 54 is connected with the charge-discharge line 51. Specifically, when the charge-discharge line 51 is connected with the discharge line 54 and the discharge detection unit 42 is connected with the discharge line 54, the discharge detection unit 42 is also capable of detecting the state of the converted AC power.

In the foregoing embodiments, when the discharge detection unit 42 detects the state of the converted AC power under a condition that the discharge detection unit 42 is connected with the charge-discharge line 51, the charge-discharge line 51 is required to be disconnected with the charge line 53 and the charge-discharge line 51 may be connected or disconnected with the discharge line 54.

In the foregoing embodiments, the device control unit 44 transmits the control signal P1c to the vehicle control unit 13 when the phase difference between the converted AC power and the system AC power is larger than the threshold value. Further, the control signal P1c may be generated by the device control unit corresponding to the phase difference, and the device control unit may transmit the control signal P1c, which is corresponding to the phase difference, to the vehicle control unit 13. That is, when the phase difference is equal to zero, the device control unit 44 may generate and transmit the control signal P1c, which indicates the phase difference is equal to zero. In this case, the device control unit 44 transmits the phase difference at S140 or S350, and then, transmits the control signal P1c corresponding to the phase difference to the vehicle control unit 13. Since the vehicle control unit 13 receives the control signal P1c from the device control unit 44 at S220 with no condition, the vehicle control unit 13 may end the process when the control signal P1c indicates that the phase difference is equal to or smaller than the threshold value, and may proceed to S230 when the control signal P1c indicates that the phase difference is larger than the threshold value.

In the foregoing embodiments, the discharge detection unit 42 and the power supply detection unit 43 may be configured to detect an alternating voltage, an alternating current, and a waveform of the AC power, and transmits all of the detection results as the control signal P1c. Then, the vehicle control unit 13 may regulate the control signal S1b based on the detection results transmitted from the discharge detection unit 42 and the power supply detection unit 43. With this configuration, a regulation accuracy of the AC power, which is converted by the converting unit 12, is increased.

When the discharge detection unit 42 and the power supply detection unit 43 detect the alternating voltage and the alternating current, the power source switching unit 31 may switch (S160, S370) the connection between the load 32 and the electric power supply system 20 to the connection between the load 32 and the discharge line 54 as the following. When the alternating current supplied from the electric power supply system 20 is equal to zero, the power source switching unit 31 may switch the connection between the load 32 and the electric power supply system 20 to the connection between the load 32 and the discharge line 54.

Further, when the alternating current supplied from the electric power supply system 20 is equal to zero, the power source switching unit 31 may disconnects the load 32 with the electric power supply system 20. Then, when the alternating current converted by the converting unit 12 is equal to zero, the power source switching unit 31 may connect the load 32 with the discharge line 54.

In the second embodiment of the present disclosure, the power supply detection unit 43 may detect the alternating voltage, the alternating current and the waveform of the alternating current supplied from the electric power supply system 20. Then, the power supply detection unit 43 may transmit all of the detection results to the vehicle control unit 13 as the control signal P1d. In this case, all of the detection results may be transmitted to the vehicle control unit 13 by changing a duty ratio of the pulse signal P1d or a potential of the pulse signal P1d.

While only the selected exemplary embodiments have been chosen to illustrate the present disclosure, it will be apparent to those skilled in the art from this disclosure that various changes and modifications can be made therein without departing from the scope of the disclosure as defined in the appended claims. Furthermore, the foregoing description of the exemplary embodiments according to the present disclosure is provided for illustration only, and not for the purpose of limiting the disclosure as defined by the appended claims and their equivalents.

What is claimed is:
1. An electric power control system, comprising:
an electric power supply system supplying an alternating current (AC) power;
a load;
a power source switching unit connected with the electric power supply system and the load, the power source switching unit switching a power source supplied to the load;
a charge-discharge switching unit connected with the electric power supply system via a charge line and connected with the power source switching unit via a discharge line;
a converting unit connected with the charge-discharge switching unit via a charge-discharge line;
an electric power storage device connected with the converting unit, wherein the converting unit converts the AC power supplied from the electric power supply system to a direct current (DC) power and charges the electric power storage device with the DC power when a charge condition is satisfied, and the converting unit discharges the electric power storage device by converting the DC power charged in the electric power storage device to an AC power when a discharge condition is satisfied;
a discharge detection unit that detects a state of the AC power converted by the converting unit, the AC power converted by the converting unit being referred to as a first AC power;
a power supply detection unit that detects a state of the AC power supplied from the electric power supply system, the AC power supplied from the electric power supply system being referred to as a second AC power; and
a control unit that controls the discharge detection unit and the power supply detection unit,
wherein the control unit includes:
  a convert control section that controls the converting unit to convert the DC power charged in the electric power storage device to the first AC power under a condition that the charge-discharge line is disconnected with the charge line;
  a detection control section that controls, under the condition that the charge-discharge line is disconnected with the charge line, the discharge detection unit to detect the state of the first AC power and controls the power supply detection unit to detect the state of the second AC power;
  a calculation section that calculates a phase difference between a phase of the first AC power and a phase of the second AC power;
  a regulation section that reduces, under the condition that the charge-discharge line is disconnected with the charge line, the phase difference by regulating the phase of the first AC power when the phase difference is larger than a predetermined threshold value; and
  a switch control section that controls:
    under the condition that the charge-discharge line is disconnected with the charge line, the power source switching unit to connect the load with the discharge line when the discharge condition is satisfied and the phase difference is equal to or smaller than the predetermined threshold value; and
    the power source switching unit to connect the load with the electric power supply system when the charge condition is satisfied.
2. The electric power control system according to claim 1, wherein the control unit further includes an additional detection control section that controls the power supply detection unit to detect the state of the second AC power before the converting unit converts the DC power charged in the electric power storage device to the first AC power, wherein the additional detection control section outputs a detection result, which indicates the state of the second AC power before the converting unit converts the DC power charged in the electric power storage device to the first AC power, to the convert control section, and wherein the convert control section controls the converting unit to convert the DC power charged in the electric power storage device to the first AC power based on the detection result transmitted from the additional detection control section so that the phase difference between the phase of the first AC power and the phase of the second AC power is reduced.

3. The electric power control system according to claim 2, further comprising an auxiliary control unit communicably connected with the control unit and controls the converting unit based on a first control signal transmitted from the convert control section of the control unit, wherein the additional detection control section outputs a detection result of the state of the second AC power to the convert control section, and wherein the convert control section generates a third control signal based on the detection result transmitted from the additional detection control section, and transmits the first control signal and the third control signal to the auxiliary control unit via a pulse signal.

4. The electric power control system according to claim 1, further comprising an auxiliary control unit communicably connected with the control unit and controls the converting unit based on a first control signal transmitted from the convert control section of the control unit, wherein the regulation section generates a second control signal, which indicates the phase difference and has a frequency higher than a frequency of the first control signal, and wherein the control unit superimposes the second control signal on the first control signal via a coupling element and transmits the first control signal and the second control signal to the auxiliary control unit.

5. The electric power control system according to claim 1, wherein the switch control section controls the power source switching unit to connect the load with the discharge line at a zero cross point of the first AC power or at a zero cross point of the second AC power, and wherein the switch control section controls the power source switching unit to connect the load with the electric power supply system at the zero cross point of the first AC power or at the zero cross point of the second AC power.

6. The electric power control system according to claim 1, wherein the detection control section controls the discharge detection unit to detect at least an AC voltage of the first AC power as the state of the first AC power, and wherein the detection control section controls the power supply detection unit to detect at least an AC voltage of the second AC power as the state of the second AC power.

7. The electric power control system according to claim 1, wherein the predetermined threshold value of the phase difference is set equal to or smaller than a maximum value of a normal-operation phase difference, and wherein the normal-operation phase difference is a phase difference under which the load performs a normal operation.

\* \* \* \* \*